Aug. 4, 1936.   R. F. MALLINA   2,049,917
ELECTROOPTICAL SYSTEM
Filed March 3, 1932   4 Sheets-Sheet 2

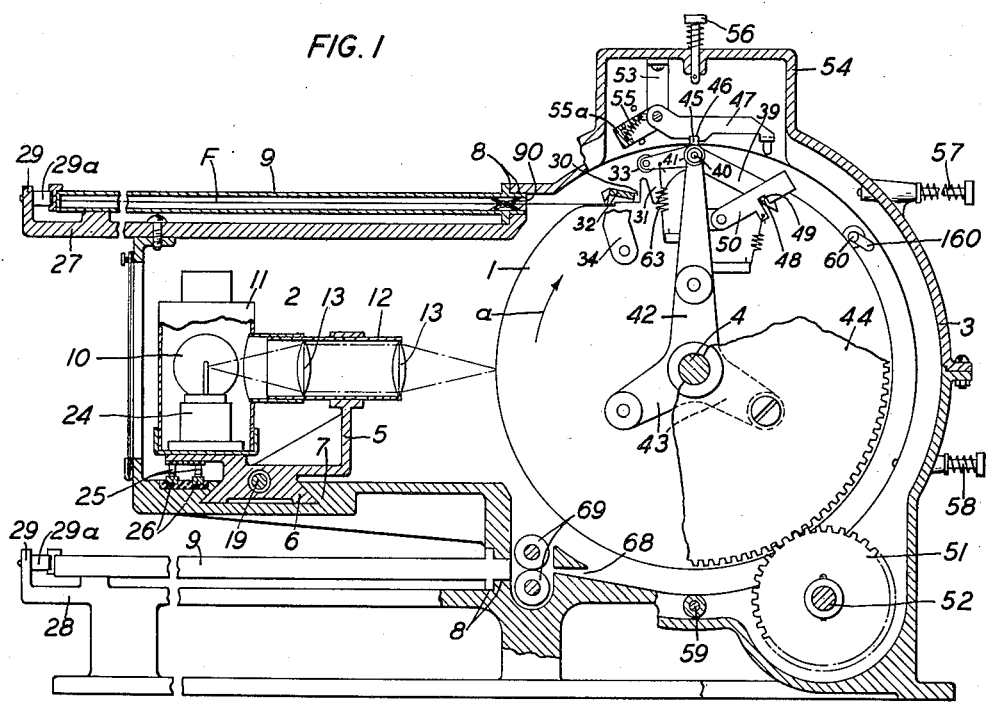

INVENTOR
R. F. MALLINA
BY
ATTORNEY

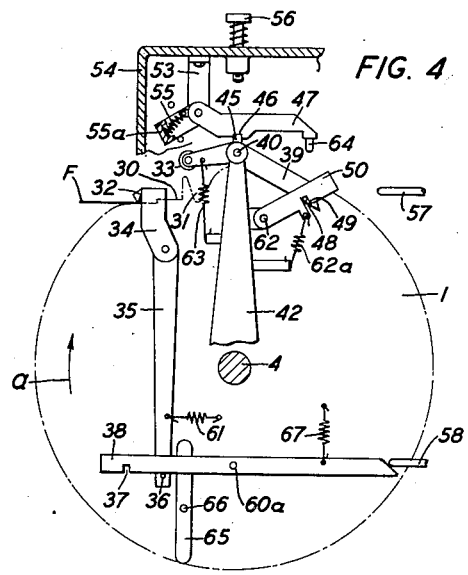
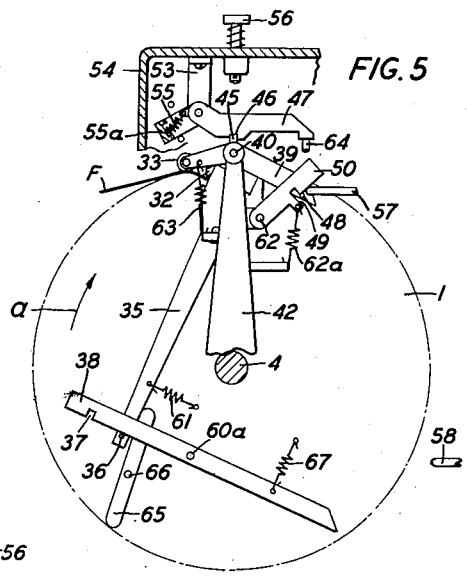
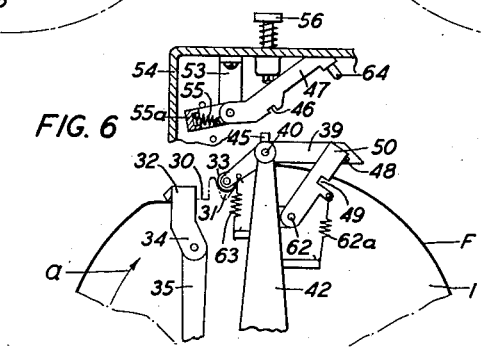
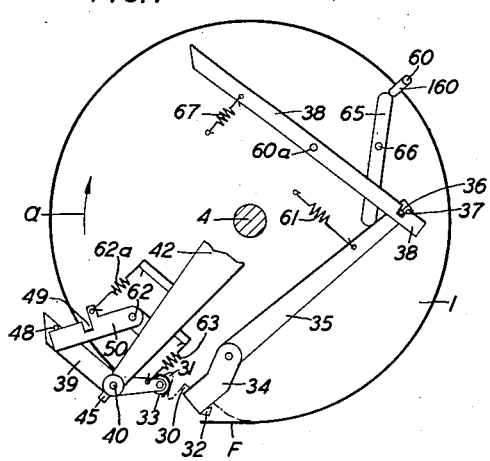
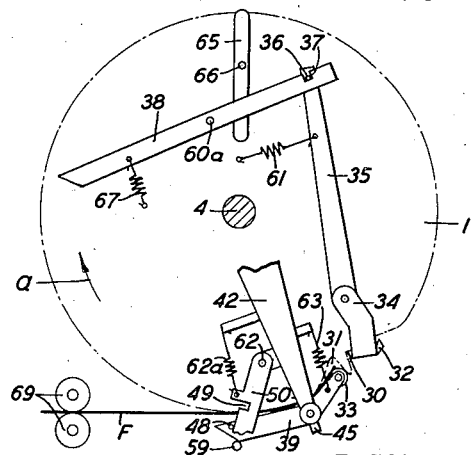

Aug. 4, 1936.  R. F. MALLINA  2,049,917
ELECTROOPTICAL SYSTEM
Filed March 3, 1932   4 Sheets—Sheet 4

INVENTOR
R. F. MALLINA
BY
ATTORNEY

UNITED STATES PATENT OFFICE 2,049,917

ELECTROOPTICAL SYSTEM

Rudolph F. Mallina, Little Neck, N. Y., assignor to Bell Telephone Laboratories, Incorporated, New York, N. Y., a corporation of New York Application March 3, 1932, Serial No. 596,483

14 Claims. (Cl. 178—7)

The present invention relates to electro-optical systems and more particularly to means for applying sheet material to a support included in an apparatus for use in such systems.

One aspect of the invention contemplates means which enables a sheet of light sensitive material to be applied in daylight, and without exposure thereto, to the surface of a support included in the terminal apparatus of electro-optical systems.

In another aspect the invention contemplates means integral with a support for securing thereto sheet material under uniform tension.

In one embodiment of the invention for use in picture transmitting systems, the support comprises a cylinder enclosed within an opaque cylindrical casing having a pair of slots spaced apart and each adapted to receive the open end of a flat film holder. The film carried by one holder has a non-sensitized edge which projects through one of the slots into the casing and into contact with a longitudinal groove in the drum, upon which is pivoted a spring actuated lever having an angular extension adapted to securely hold the non-sensitized edge of the film in contact with one wall of the groove. As the drum is rotated, the film is drawn out of the holder and wrapped upon the drum. A roller, carried by a second lever pivoted on the drum, engages the film to maintain it in smooth and intimate contact with its surface as the drum is rotated and, near the end of one complete revolution of the drum, this roller forces the other edge of the film into a second groove, provided in the drum, which is adjacent to and parallel with the first groove. In this manner, the film is secured to the drum with which is associated an optical system, including a light source or valve controlled by incoming picture currents. In order to produce a record on the film, the drum may be rotated, while the optical system is moved longitudinally thereof, or the optical system may remain stationary and the drum may be given a motion of rotation and translation, as disclosed in United States Patent 1,706,032, March 19, 1929 to M. B. Long.

When the recording process is completed, a lever having the angular extension, is actuated to release the non-sensitized edge of the film and, as the drum rotates, the film passes through a pair of guide rolls and the other slot in the enclosing casing and into the second film holder associated with this slot. The interior wall of the open end of each holder is provided with means engaging the film to exclude light, whereby a film may be applied to and removed from the drum of the picture receiving apparatus, situated in a lighted room or compartment, without the film being exposed to the action of the light illuminating the room.

In another embodiment each edge of the film is provided with a series of apertures respectively engaged by a series of pins carried by the drum. One set of pins is stationary and engages one series of apertures, and the series of apertures at the other edge of the film are engaged by the second set of pins, carried by a member adapted to be actuated by a lever to move them toward the stationary pins. The member is provided with a ratchet engaged by a pawl to hold the second set of pins in adjusted position, whereby the film is uniformly tensioned and drawn into intimate contact with the periphery of the drum.

A detailed description of the invention follows and is illustrated in the attached drawings in which:

Fig. 1 illustrates a view in cross-section of a receiving apparatus, the drum being shown in end elevation, involving the invention;

Fig. 2 illustrates a longitudinal view of certain parts of the apparatus shown in Fig. 1 with the casing in section;

Figs. 4 to 8 schematically illustrate details of the receiving apparatus of Fig. 1 to which reference will be hereinafter made in describing the operation of securing a film on the drum and effecting its release therefrom; and Figs. 9 to 13 schematically illustrate another form of receiving apparatus, which involves the invention.

Figure 3:
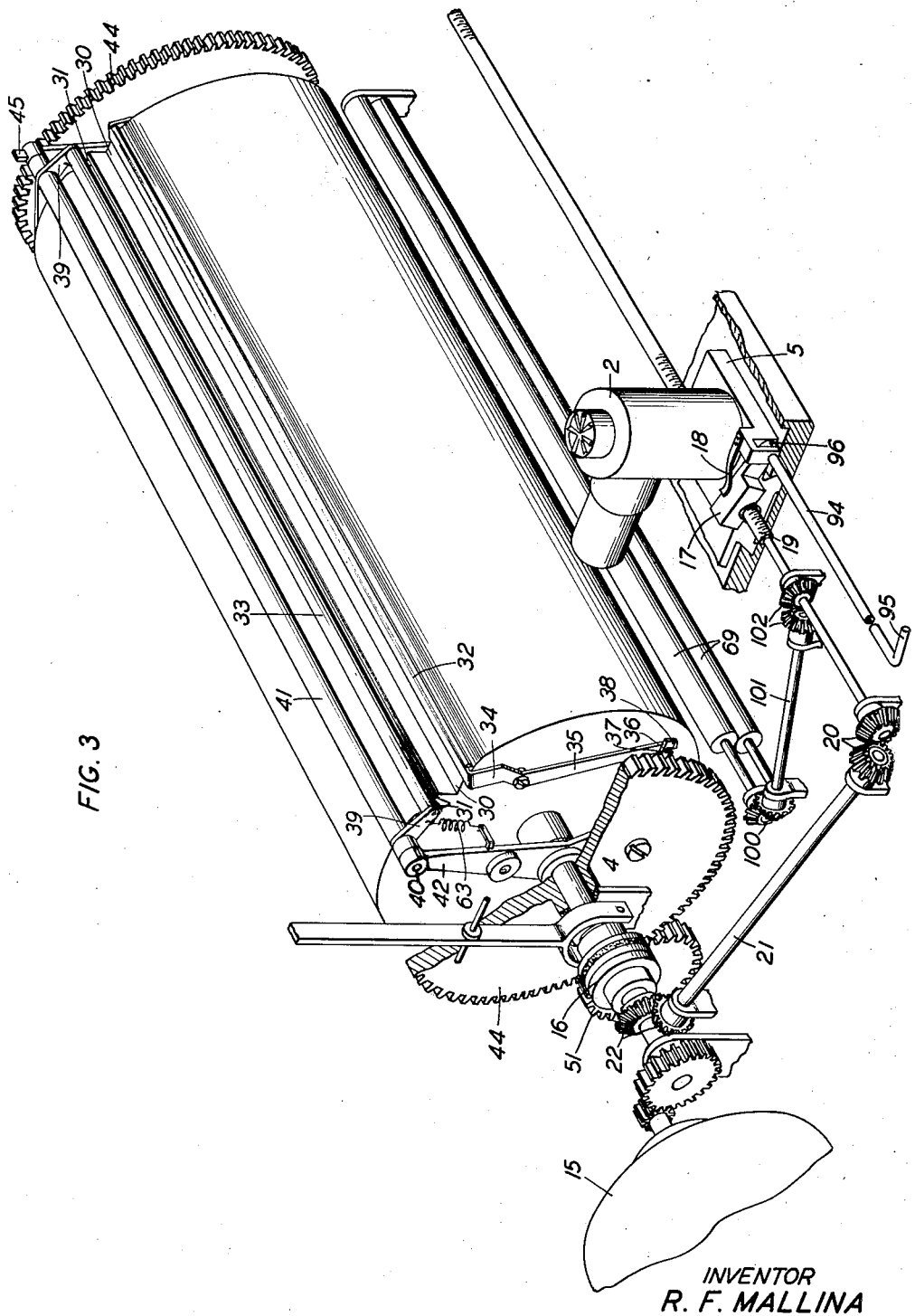
Fig. 3 is a perspective view of the receiving apparatus of Fig. 1 with the casing removed.

Figs. 1 to 3 illustrate a receiving aparatus comprising a rotatable drum or cylinder 1, upon which a film or other recording medium may be mounted, associated with an optical system 2 adapted to be driven longitudinally of the drum and a light-proof casing 3 enclosing the apparatus.

Drum 1 is secured to a rotatable shaft 4 and the optical system 2 is mounted on a carriage 5 having an extension 6 engaging a trackway 7 provided in the light-proof casing 3, and the latter is provided with a pair of longitudinally extending slots or openings 8 adapted to be engaged by flat film holders 9.

The optical system comprises a lamp 10 enclosed in a receptacle 11 provided with an extension 12 directed toward the drum 1 and enclosing a lens system, indicated by a pair of lenses 13, which serves to focus the light from lamp 10 upon the film carried by the drum 1.

As shown in Figs. 2 and 3, the drum 1 may be manually rotated by a crank 14, for the purpose of mounting a film thereon as will be hereinafter described, or it may be driven for recording purposes by a motor 15 through a gear coupling and clutch 16.

Referring to Fig. 3, the carriage 5, carrying the optical system 2, is provided with a screw threaded coupling element 17 adapted to be held in engagement by a spring 18 with the threaded section of shaft 19, which is also connected through a gear 20, shaft 21 and gear 22 to the driving motor 15.

When the drum 1 is rotated and the optical system 2 is simultaneously moved lengthwise of the drum, the spot of light supplied by the optical system will trace a spiral path on a film carried by the drum.

To provide a record, corresponding to a picture or other representation scanned at a sending station, the lamp 10 is supplied with picture currents produced at the sending station and transmitted over a communication channel. The picture current, varying in amplitude in accordance with the tone values of successive elemental areas of a representation scanned for transmission at a sending station may be produced at the sending station by any one of a number of well known picture transmitting mechanisms. A suitable apparatus which may be used for this purpose is disclosed in the above mentioned patent to Long. In accordance with well established practice, the incoming picture current, after being amplified at the receiving station, may be supplied to the lamp 10. This current may be supplied through a circuit connected to binding posts (not shown) mounted on the casing 3 and through flexible conductors within this casing to the contacts of the lamp socket 24. Other well known means may be used to connect the lamp socket contacts to the receiving circuit, which is external to the light-proof casing 3. For example, as indicated in Fig. 1, the carriage 5 may be provided with flexible contacts 25 adapted to engage fixed conductors 26 mounted on one interior wall of the casing, insulated therefrom and each other, and connected to the binding posts (not shown).

In order that the picture reproduced at the receiver may be a facsimile of the representation at the transmitter, the receiving apparatus must operate in synchronism and in phase with the scanning apparatus at the transmitter. A suitable means for effecting this result is disclosed in the above mentioned Long patent.

The light-proof casing 3 of Fig. 1 is provided with extensions 27 and 28 for supporting the film holders 9 in alignment with the slots 8. These extensions are provided with flanges 29, which carry resilient means 29a adapted to permit the film holders to be properly positioned with respect to the slots 8 and to force the open end of the holders into these slots, so that no light may enter the casing. The interior walls of the film holders adjacent the open end are provided with strips of soft flexible material 30 which engage the opposite surfaces of the film and thereby prevent light entering the holder, whereby these holders after being loaded with films in a dark room, may be applied to a receiving apparatus located in a room or compartment which is illuminated, without exposing the sensitized surface of the film to the action of light.

The periphery of drum 1 (see Fig. 3) is provided with two longitudinally extending and closely adjacent, parallel grooves 30 and 31, having respectively associated therewith a gripping member 32 and a roller 33.

Member 32 extends the full length of the drum 1 and is carried by brackets 34 pivotally mounted on the ends of the drum. At one end of the drum, namely, the left-hand end, the bracket 34 is provided with an extension 35 carrying a pin 36 adapted, under certain conditions of operation, to engage a notch 37 in a pivoted lever 38.

Roller 33 also extends the full length of the drum and is carried by pivoted arms 39 mounted for oscillation on a shaft 40 which is provided with a sleeve 41 adapted to space the arms 39 apart and maintain them in proper position relatively to the drum. Shaft 40 is supported by levers 42 each mounted for free oscillation on the drive shaft 4. These levers are provided with extensions 43 secured to gear wheels 44 at the respective ends of the cylinder. At one end of the cylinder, namely, the right-hand end, shown in elevation in Fig. 1, the lever 42 is provided with a tooth 45 extending into a notch 46 in a spring controlled lever 47, whereby lever 42 and roller 33 are held in a fixed position until the film has been secured on the drum. At the right-hand of the drum, arm 39, which supports the roller 33, is provided with a pin 48 adapted to extend into a notch 49 in a spring controlled arm 50 pivoted on the lever 42. This connection serves to lock the levers 42 and the roller 33 carried thereby in fixed position.

Gear wheels 44 are mounted on shaft 4 to freely rotate relatively to the drum 1, until the film is secured thereon, and are connected together through gears 51 and shaft 52, whereby both levers 42 are positively driven. Because of the great length of the cylinder, this positive drive is desirable, in order to maintain the levers 42 in alignment with each other at all times and thereby ensure that the roller 33 is accurately aligned with the groove 31.

Lever 47 is pivotally mounted on a bracket 53 in a housing 54, forming an extension at the right-hand end of casing 3 as shown in Figs. 1 and 2. This lever and a yoke-shaped member 55a constitute a toggle mechanism provided with a compression spring 55 which tends to hold the lever in either one of two extreme positions. As the toggle mechanism is moved to align the lever 47 and yoke 55a, the spring 55 is compressed and when the dead center is passed, the spring serves to snap the lever 47 into one extreme position, either that shown in Fig. 1, or as shown in Fig. 6.

Casing 3 is provided with a number of control members 56, 57, 58, 59 and 60 each of which is held in a retracted position, as shown in Figs. 1 and 2, by a spring. Control members 56, 57, 58 and 59 comprise straight rods which, as will be hereinafter set forth, are adapted to be actuated in a definite sequence to respectively engage elements for controlling the operation of the film mounting mechanism. These members are so mounted, relatively to the receiving apparatus, that they do not interfere with its operation either in their retracted positions or when operated. Member 60 is mounted in the left-hand end wall of the casing 3 at a point beyond the periphery of the cylinder 1 and is provided with an offset 160 at its inner end. The control spring for this member has its respective ends secured to the knob 161 and the boss 162 on the casing, the member being thereby held in the normal or inoperative position shown in Fig. 1, so that its offset end does not interfere with the operation of the apparatus. This member is moved to an operative position, for a purpose to be hereinafter set forth, by pushing it in and then rotating the knob 161 so that its offset end 160 lies in a plane adjacent the left-hand end of the cylinder 1 and with its tip in the position shown in Fig. 7. When the film mounting has been completed the toggle mechanism is actuated to occupy the position shown in Fig. 6, as will be described later and may be restored to the position as shown in Fig. 1, by actuating the control member 56. Control members 58 and 57 are actuated in that order to control the operation of certain elements of the film, holding mechanism to permit an unexposed film to be secured in intimate contact with the surface of the cylinder, while 60 and 59 are actuated successively to cause certain elements of the film holding means to be operated and thereby permit an exposed film to be removed from the cylinder.

The above described apparatus is operated as follows to withdraw an unexposed film F from the upper film holder 9 and secure it to the cylinder 1 and to effect the release of an exposed film from the cylinder 1 and project it into the lower film holder 9.

In the following description reference will be made to Figs. 4 to 8, in which the control members for the gripping element 32 and roller 33 are shown as a matter of convenience in substantially the same plane. As pointed out above, the control elements for the member 32 are mounted on the left-hand end of cylinder 1 and the control elements for roller 33 are adjacent the right-hand end of the cylinder.

As shown in Fig. 1 a holder 9 carrying a film F is applied to the upper tabular extension 27 and an unloaded film holder 9 is applied to the lower extension 28. The unsensitized portion of the film carried by the upper holder 9 projects through the corresponding slot 8 and into the groove 30 immediately beneath the gripping element or rod 32. The control member 58 (at the left-hand end of the casing) is pressed inwardly to engage the end of lever 38, as shown in Fig. 4, which is thereby oscillated about its pivot 60ª to raise its other end sufficiently to permit the pin 36 to be released from the notch 37. Spring 61 oscillates the bracket 34—35 about its pivot and thereby causes the element 32 to grip the unsensitized end of the film between it and one wall of the groove 30.

Crank 14 is moved longitudinally of shaft 4 to bring the clutch members 14ª into engagement and is then operated to rotate the cylinder 1, in the direction of the arrow a in Figs. 1 and 4. The gripping element 32 is thereby displaced with respect to the film holder 9 and levers 42, the film F being drawn through the slot 8.

When the cylinder occupies the position shown in Fig. 5, the control member 57 (at the left-hand of the casing) is actuated, so that its inner end engages the lever 50 which is thereby oscillated about its pivot 62 against the action of spring 62ª sufficiently to permit the pin 48, carried by the arm 39, to be withdrawn from the notch 49. When this occurs arms 39 are rotated by springs 63 to draw the roller into contact with the film F at a point beyond the edge of groove 30.

As the rotation of the cylinder is continued, the roller 33 serves to maintain the film in smooth and intimate contact with its surface. When the cylinder has almost completed one revolution the roller 33 will be in contact with the other end of the film and in line with the groove 31. Springs 63 cause arms 39 to rock on the shaft 40, thereby forcing the roller and the underlying portion of the film F into the groove 31, as shown in Fig. 6, to complete the mounting of the film on the cylinder and to mechanically couple the levers 42 with the cylinder. When the roller 33 drops into the groove 31, the remote end of lever 39, at the right-hand side of the cylinder, strikes the projection 64 on the lever 47 with sufficient force to permit the spring 55 to snap lever 47 into the position shown in Fig. 6, whereby the notch 46 no longer engages the tooth 45, and the levers 42 are free to rotate with the cylinder 1.

The film having been mounted on the cylinder 1, the apparatus is now ready for the recording operation. This is accomplished, after the necessary preliminary adjustments have been effected, by operating the clutch 16 to mechanically connect the apparatus to the driving motor 15 and, at the same time, completing the circuit over which the picture current is supplied to the lamp 10. During the recording operation, the gripping member 32 and roller 33 will rotate with the cylinder 1, the portion of the periphery of the cylinder defined by these elements corresponding to the underlap section during which incoming synchronizing impulses from the transmitter may be received and utilized to control the operation of the apparatus.

The recording operation being completed, the control member 60 (at the left-hand end of the cylinder) is pushed in and rotated so that its inner end lies in the path of lever 65 pivotally mounted at 66 on the left-hand end of the cylinder. As the cylinder continues to rotate the offset tip 160 of control member 60 is engaged by the outer end of lever 65, which is thereby oscillated about its pivot 66 to cause its inner end to actuate extension 35, whereby the gripping element is raised to release the end of the film and ultimately to cause the pin 36 carried by extension 35 to enter notch 37 in lever 38, in which position it is held by the spring 67, as shown in Fig. 7. Continued rotation of the cylinder causes the free end of the film to pass through the channel 68 (Fig. 1) at the bottom of the casing 3 and between the draw-off rollers 69. Referring now to Fig. 3, it will be seen that rollers 69 are connected through gear 100, shaft 101 and gear 102 to shaft 19, which is driven by motor 15. As the cylinder approaches the position shown in Fig. 8, the control member 59 (at the right-hand end of the casing) is actuated, so that its inner end projects into the path of arm 39. When member 59 engages arm 39, the latter is rocked about its pivot 40 sufficiently to raise the roller 33 out of the groove 31 and thereby release the other end of the film. The ratio of the gear connection driving the rolls 69 is such that during the withdrawal period a slight tension is applied to the film, which is guided by these rolls into the lower film holder 9.

After arm 39 passes the control member 59, spring 63 draws the roller 33 into the groove 31 to connect levers 42 to the cylinder, and hence cause them to be carried toward the starting position. The clutch may now be actuated to disconnect the motor 15 from the receiving apparatus and the crank 14 may be used to restore the cylinder to its starting position. As the cylinder approaches this position and after the projection end of 39 has passed the notched portion of lever 47, which can be determined by the angular rotation of the crank 14, the control member 56 is actuated to restore lever 47 to the position shown in Figs. 1, 4 and 5. When the starting position is reached, tooth 45 carried by lever 42 will be engaged by the notch 46, and hold the cylinder in position to receive a new film.

Optical system 2 may be restored to its initial position, at the left-hand end of cylinder 1 as shown in Fig. 3, by means of a shaft 94 which extends through a light-proof joint in the casing 3 and is provided with a handle 95. Element 17, for coupling the optical system to the threaded portion of shaft 19 is provided with an extension secured to the carriage 5 and to the rod 94 by a pin 96, so that, when the handle 95 is rotated, element 17 is disengaged from the screw thread on shaft 19. To restore the optical system to its initial position at the left-hand end of the cylinder 3, handle 95 is rotated to disengage element 17 from shaft 19 against the action of spring 18 and is then moved to the left by means of rod 94. Spring 18 serves to reengage element 17 with the threaded portion of shaft 19.

An alternative film mounting and securing mechanism, which may be substituted for that described above, is illustrated in Figs. 9 to 12, inclusive.

The cylinder 70 mounted on the shaft 4 and enclosed within the casing 3, is provided with a longitudinal groove 71 having a series of apertures 72 in one wall and a second series of apertures 73 in its other wall. Secured to lugs 74 on the inner wall of the cylinder and spaced apart longitudinally thereof are a series of more or less flexible fingers 75, each of which projects through an aperture 72 into the groove 71. These fingers are of such length that their outer ends do not project beyond the peripheral line of the cylinder.

The cylinder is provided with end plates 76 between which extends a square rod or shaft 77 upon which is secured a comb-shaped member 78, with a tooth or finger 79 thereof projecting through each of the apertures 73 into the groove 71. Mounted on and secured to the end of shaft 77, externally of the end plate 76, is a ratchet and pawl mechanism comprising an adjustable member 80 provided with a ratchet 81 and having two projections 82, 83. This member is associated with a pivoted lever 84 carrying a tooth 85 adapted to engage with the teeth of ratchet 81. Tooth 85 is adapted to be held in engagement with the ratchet teeth by a spring 86 connected to the projection 82 on member 80 and lever 84.

Figure 13:
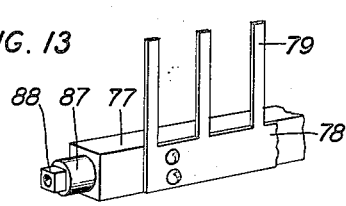

Member 80 may be operated to rotate the shaft 77 and thereby adjust the position of fingers 79 with respect to fingers 75, for a purpose to be set forth later, by means of projection 83. In order to permit this adjustment, shaft 77 is provided with round section 87 adapted to engage with bearings in the end plates 76, and its outer end 88 is preferably made square, as shown in Fig. 13. Member 80 is provided with a square opening to engage section 88 of the shaft, and this member may be held on the shaft by a screw 89. Alternatively, section 88 and the cooperating opening in member 80 may be round and a set screw or cotter-pin may be used to couple them together. Films for use with the apparatus of Figs. 9 to 13 are provided along each end with apertures, spaced the same distance apart as the fingers 75 and 79.

An unexposed film may be secured to the cylinder 70 and, after being exposed as described in connection with Fig. 1, may be removed therefrom in the following manner. A film holder 9 enclosing a film F is applied to the upper support 27 with its unsensitized and apertured end projecting through slot 8.

Figure 9:
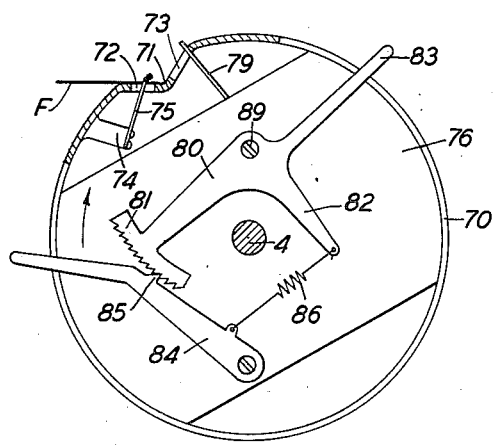
Figure 10:
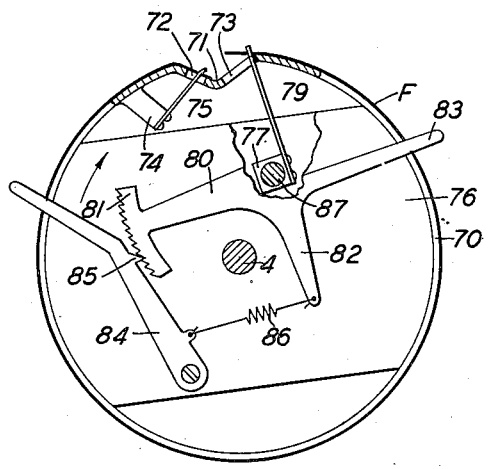

As shown in Fig. 9, the cylinder is adjusted to have one wall of the groove 71 in the same plane as the support 27, and the holder is so positioned that the apertures in the unsensitized end of the film, projected through the slot 8 are in line with fingers 75 and are in such position as to engage these fingers. Crank 14 is then operated to rotate the cylinder 70 and withdraw the film from the holder. At the end of approximately one complete revolution, the apertures in the other end of the film F engage the set of fingers 79 which are positioned adjacent the right-hand edge of slots 73, as shown in Fig. 10.

Figure 11:
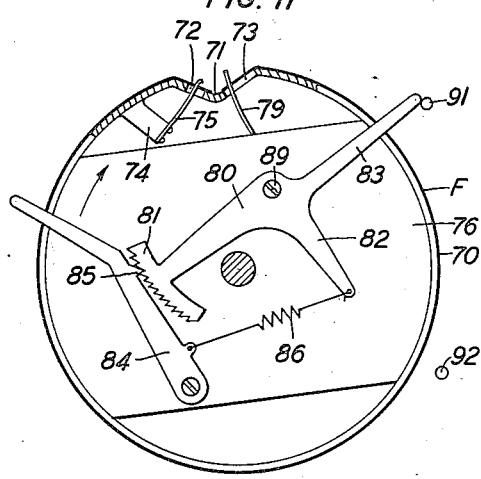
Figure 12:
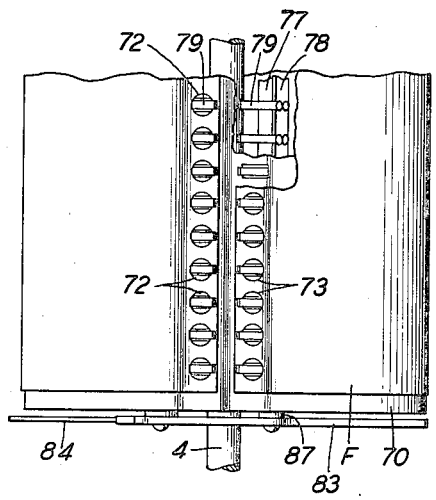

A control member 91 carried by the casing 3 and comprising a rod adapted to be held in retracted position by a spring in a manner similar to member 58, is operated so that its inner end lies in the path of projection 83. The cylinder is rotated and, as the end of projection 83 rides over control member 91, member 80 will be adjusted to carry fingers 79 toward the fingers 75 and thereby draw the film into smooth and intimate contact with the surface of the cylinder, as shown in Fig. 11. At the same time the ratchet 81 moves relatively to its pawl and, when the adjustment of member 80 is completed, tooth 85 is in engagement with one of the teeth of the ratchet, to thereby lock member 80 in adjusted position and hold the film on the cylinder with the fingers 79 near the left-hand edge of apertures 73 and with their outer ends below the peripheral line of the cylinder.

After the necessary adjustments have been made to ensure that the electrical apparatus is operating satisfactorily and the cylinder 70 is properly synchronized and in phase with the transmitter scanning means, motor 15 is coupled to the cylinder and optical system and the lamp 10 is supplied with the picture current to produce a record on the film. Having completed the record and with the cylinder in a position substantially 180° from that shown in Fig. 11, i. e., with the groove 71 adjacent the bottom of the casing 3, a second control button 92, similar to member 91, is operated with its inwardly projecting end in the path of lever 84, which is thereby actuated to release the pawl from the ratchet 81 and member 80 and shaft 77 are rotated to carry fingers 79 to the position shown in Fig. 10. The free end of the film, normally held by the fingers 75, slips off these fingers and into contact with the bottom of the casing. As the rotation of the cylinder is continued, the free end of the film is projected through the passage 68 and between the pull-off rolls 69, which directs the film into the lower film holder 9, as previously described. The driving motor may then be disconnected and the cylinder may be rotated by the crank 14 into the starting position shown in Fig. 9.

In most cases, it is preferable to provide an adjusting mechanism, comprising the member 80 and the associated lever 84, at each end of the cylinder. This, of course, requires that the casing be provided with release members 91 and 92 at its respective ends. Under certain operative conditions, however, a single control mechanism, comprising members 80, 91, 92 and lever 84, may be sufficient.

One advantage of arranging the film holding fingers 15 and 19 so that they do not project beyond the peripheral line of the cylinder is that the optical system may be positioned close to the film, thereby reducing the space required by the apparatus and permitting a more efficient use of the light supplied by the lamp 10.

If found desirable, the mechanism hereinbefore described may be used to secure a picture or other representation on the cylinder or drum included in the transmitter of a picture transmission system.

What is claimed is:

1. Terminal apparatus for an optical system comprising a light-proof casing, a support for sheet material in said casing, a light-proof holder external to and engaging said casing, a light sensitive sheet carried by said holder, means actuated by movement of said support for engaging one end of said sheet and for withdrawing it from said holder, and means automatically engaging the other end of said sheet upon actuation of said support for securing said sheet to said support.

2. Terminal apparatus for an optical system comprising a light-proof casing, a support for sheet material in said casing, a light-proof holder external to and engaging said casing, a light sensitive sheet carried by said holder, and means actuated by the movement of said support and mounted thereon for engaging one end of the sheet to withdraw it from said holder and for engaging the other end of said sheet to secure the sheet to said support.

3. Terminal apparatus for an optical system comprising a light-proof casing, a support for sheet material in said casing, a light-proof holder engaging said casing, a light sensitive sheet carried by said holder, and means carried by said support for mounting the sheet material thereon, comprising means for engaging one end of the sheet for withdrawing it from the holder and for securing said end relatively to the support, and means engaging the other end of the sheet for completing the mounting thereof on said support.

4. Terminal apparatus for an optical system comprising a light-proof casing, a support for sheet material in said casing, a light-proof holder engaging said casing, a light sensitive sheet carried by said holder, and means pivoted on said support for mounting said material on said support, comprising means engaging one end of the material for withdrawing it from the holder and for securing such end relatively to the support, and means engaging the other end of the material for securing said material to said support.

5. Terminal apparatus for an optical system comprising a light-proof casing, a support for sheet material in said casing, a light-proof holder external to and engaging said casing, a light sensitive sheet carried by said holder, a groove in said support, means for securing one end of said sheet in said groove, whereby actuation of said support serves to withdraw the sheet from said holder, and means for automatically securing the other end of the sheet to said support upon actuation of said support.

6. Terminal apparatus for an optical system comprising a light-proof casing, a support for a single layer of sheet material in said casing, a light-proof holder external to and engaging said casing, a light sensitive sheet carried by said holder, a groove in said support, means cooperating with one wall of the groove for holding one end of said sheet, and means for securing the other end of the sheet to said support.

7. Terminal apparatus for an optical system comprising a light-proof casing, a support for sheet material in said casing, a light-proof holder external to and engaging said casing, a light sensitive sheet carried by said holder, a groove in said support, means cooperating with one wall of the groove for holding one end of said sheet, a second groove in said support, and means for holding the other end of said sheet in said second groove.

8. A device for securing light sensitive sheet material having perforated ends upon a support provided with a groove comprising a set of flexible fingers mounted on said support and projecting into said groove and through the perforations in one end of said sheet, a second set of fingers projecting into said groove and through the perforations in the other end of said sheet, means for moving said second set of fingers relatively to said first set of fingers, and a light proof enclosing casing for said support.

9. A device for securing a light sensitive sheet having perforated ends upon a cylinder provided with a groove comprising a set of flexible projections mounted on said cylinder and extending into said groove and through the perforations in one end of said sheet, a second set of fingers projecting into said groove and through the perforations in the other end of said sheet, the ends of both sets of said projections lying in the space defined by the periphery of said cylinder, means for adjusting said second set of projections toward said first set of fingers, and a light proof enclosing casing for said cylinder.

10. A device for securing a sheet having perforated ends upon a cylinder provided with a groove comprising a set of substantially stationary projections carried by said cylinder, extending to a point intermediate the depth of said groove and projecting through a plurality of perforations in one end of said sheet, a second set of projections extending through a plurality of perforations in the other end of said sheet, an adjustable member carrying said second set of projections, resilient means tending to hold said member and the projections carried thereby in a position remote from said stationary projections, and means for adjusting said member and its projections toward said stationary projections and for locking said member in adjusted position so that the ends of the projections carried by the member lie intermediate the depth of said groove.

11. Means for mounting light sensitive sheet material upon a cylinder comprising a set of flexible fingers stationary with respect to said cylinder, means for guiding the sheet material to cause said set of fingers to engage a plurality of apertures in one end of the sheet, a member having a set of fingers for engaging a plurality of apertures in the other end of said sheet, and means for securing said member to said cylinder.

12. Means for mounting sheet material upon a cylinder having a longitudinal groove comprising a set of resilient fingers stationary with respect to said cylinder for engaging a plurality of apertures in one end of the sheet, means for mounting said fingers to extend into said groove with their ends intermediate the depth thereof, a second set of fingers for engaging a plurality of apertures in the other end of said sheet, and a member carried by said cylinder for supporting said second set of fingers within said groove.

13. Terminal apparatus for an optical system comprising a light proof casing enclosing a cylindrical support, a light proof holder external to and engaging said casing, a light sensitive sheet within said holder, and means actuated by rotation of said cylindrical support for mounting said sheet on said support, comprising means for engaging one end of said sheet to withdraw it from said holder and means for engaging the other end of the sheet, whereby said sheet is secured to said support in a single layer.

14. Means for mounting sheet material upon a cylindrical support, comprising a casing enclosing said support and provided with a slot, a holder enclosing a sheet of material engaging said slot, and means controlled by rotation of said support for engaging one end of said sheet to withdraw it from said holder and wrap it upon said support means for engaging the other end of the sheet, whereby said sheet is secured to said support.

RUDOLPH F. MALLINA.